(12) United States Patent
Kinoshita et al.

(10) Patent No.: US 11,756,496 B2
(45) Date of Patent: *Sep. 12, 2023

(54) DISPLAY DEVICE

(71) Applicant: Japan Display Inc., Tokyo (JP)

(72) Inventors: Kohei Kinoshita, Tokyo (JP); Chihiro Tanaka, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/942,269

(22) Filed: Sep. 12, 2022

(65) Prior Publication Data

US 2023/0005444 A1 Jan. 5, 2023

Related U.S. Application Data

(63) Continuation of application No. 17/213,935, filed on Mar. 26, 2021, now Pat. No. 11,475,859, which is a
(Continued)

(30) Foreign Application Priority Data

Sep. 28, 2018 (JP) ................................. 2018-184924

(51) Int. Cl.
*G09G 3/36* (2006.01)
*G06F 3/041* (2006.01)
(Continued)

(52) U.S. Cl.
CPC ......... *G09G 3/3648* (2013.01); *G02F 1/1368* (2013.01); *G02F 1/136286* (2013.01);
(Continued)

(58) Field of Classification Search
CPC .. G09G 3/3648; G09G 3/3674; G09G 3/3685; G09G 2300/0426; G02F 1/136286; G02F 1/1368
See application file for complete search history.

(56) References Cited

U.S. PATENT DOCUMENTS 10,126,584 B2* 11/2018 Maede .................. G06F 3/0445
2010/0002156 A1* 1/2010 Tsou .................. G02F 1/136286
349/33
(Continued)

FOREIGN PATENT DOCUMENTS

JP       2010-197576 A    9/2010
WO    WO2018/092758 A1   5/2018

OTHER PUBLICATIONS

International Search Report issued in International Patent Application No. PCT/JP2019/032706 dated Nov. 26, 2019 and English translation of same. 3 pages.
(Continued)

*Primary Examiner* — Ibrahim A Khan
(74) *Attorney, Agent, or Firm* — K&L Gates LLP

(57) ABSTRACT

A display device includes: pixel electrodes including a first pixel electrode and a second pixel electrode adjacent to the first pixel electrode in a first direction; switching elements including a first switching element coupled to the first pixel electrode and a second switching element coupled to the second pixel electrode; gate lines including a first gate line coupled to the first switching element and a second gate line coupled to the second switching element; a gate driver supplying a gate signal to the gate lines; and drive electrodes including a first drive electrode and a second drive electrode adjacent to the first drive electrode in the first direction. The first drive electrode overlaps the first and second pixel electrodes, and the second gate line. The second drive electrode overlaps the first gate line. The gate driver supplies the gate signal to the first and second gate lines simultaneously.

16 Claims, 10 Drawing Sheets

Related U.S. Application Data continuation of application No. PCT/JP2019/032706, filed on Aug. 21, 2019.

(51) Int. Cl.
*G02F 1/1362* (2006.01)
*G02F 1/1368* (2006.01)

(52) U.S. Cl.
CPC ......... *G09G 3/3674* (2013.01); *G09G 3/3685* (2013.01); *G09G 2300/0426* (2013.01)

(56) References Cited

U.S. PATENT DOCUMENTS

| | | | |
|---|---|---|---|
| 2010/0214262 A1 | 8/2010 | Ishizaki et al. | |
| 2012/0038585 A1* | 2/2012 | Kim | G06F 3/0443 445/24 |
| 2013/0033439 A1* | 2/2013 | Kim | G06F 3/0443 345/173 |
| 2013/0278528 A1 | 10/2013 | Ishizaki et al. | |
| 2014/0043274 A1* | 2/2014 | Yao | G06F 3/04166 345/173 |
| 2014/0048854 A1* | 2/2014 | Wang | G06F 3/0412 257/254 |
| 2014/0111473 A1* | 4/2014 | Yang | G06F 3/0443 345/174 |
| 2014/0160061 A1* | 6/2014 | Kim | G06F 3/0412 345/174 |
| 2014/0160066 A1* | 6/2014 | Kim | G06F 3/0445 345/174 |
| 2014/0253493 A1* | 9/2014 | Cho | G06F 3/0412 345/173 |
| 2015/0103276 A1 | 4/2015 | Ishizaki et al. | |
| 2015/0103277 A1 | 4/2015 | Ishizaki et al. | |
| 2016/0027356 A1* | 1/2016 | Cheng | G06F 3/04184 345/173 |
| 2016/0048267 A1* | 2/2016 | Lee | G06F 3/0443 345/173 |
| 2016/0357329 A1 | 12/2016 | Oke et al. | |
| 2017/0090239 A1* | 3/2017 | Jung | G02F 1/133345 |
| 2017/0168650 A1* | 6/2017 | Lee | G06F 3/04166 |
| 2017/0371466 A1 | 12/2017 | Ishizaki et al. | |
| 2019/0339557 A1* | 11/2019 | Tominaga | G02F 1/13338 |
| 2019/0391430 A1* | 12/2019 | Morinaga | G02F 1/134309 |
| 2020/0233517 A1 | 7/2020 | Ishizaki et al. | |

OTHER PUBLICATIONS

International Written Opinion issued in International Patent Application No. PCT/JP2019/032706 dated Nov. 26, 2019. 3 pages.
Office Action issued in related Indian Patent Application No. 202117013087 dated Feb. 4, 2022. 6 pages.

* cited by examiner

FIG.2
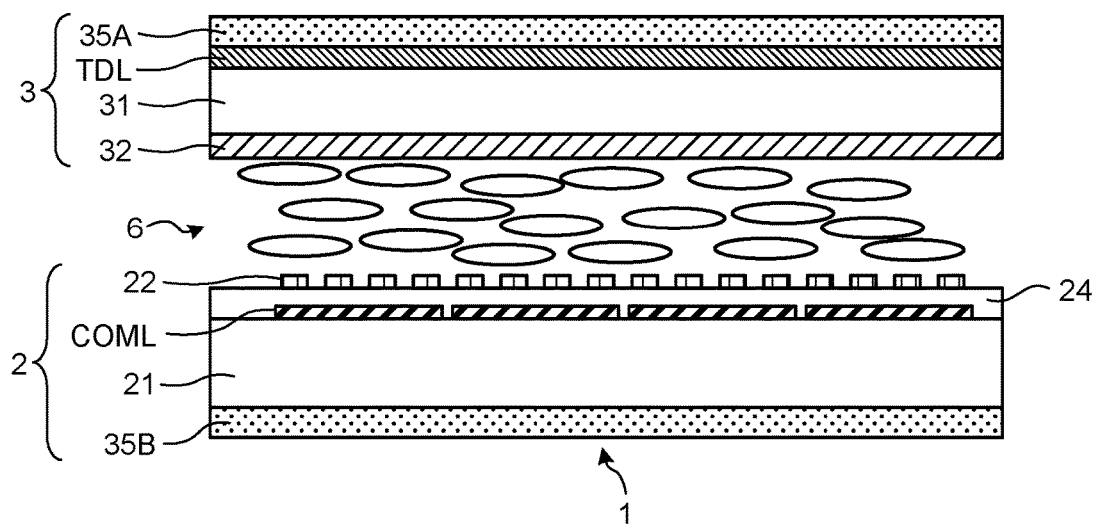
FIG.3
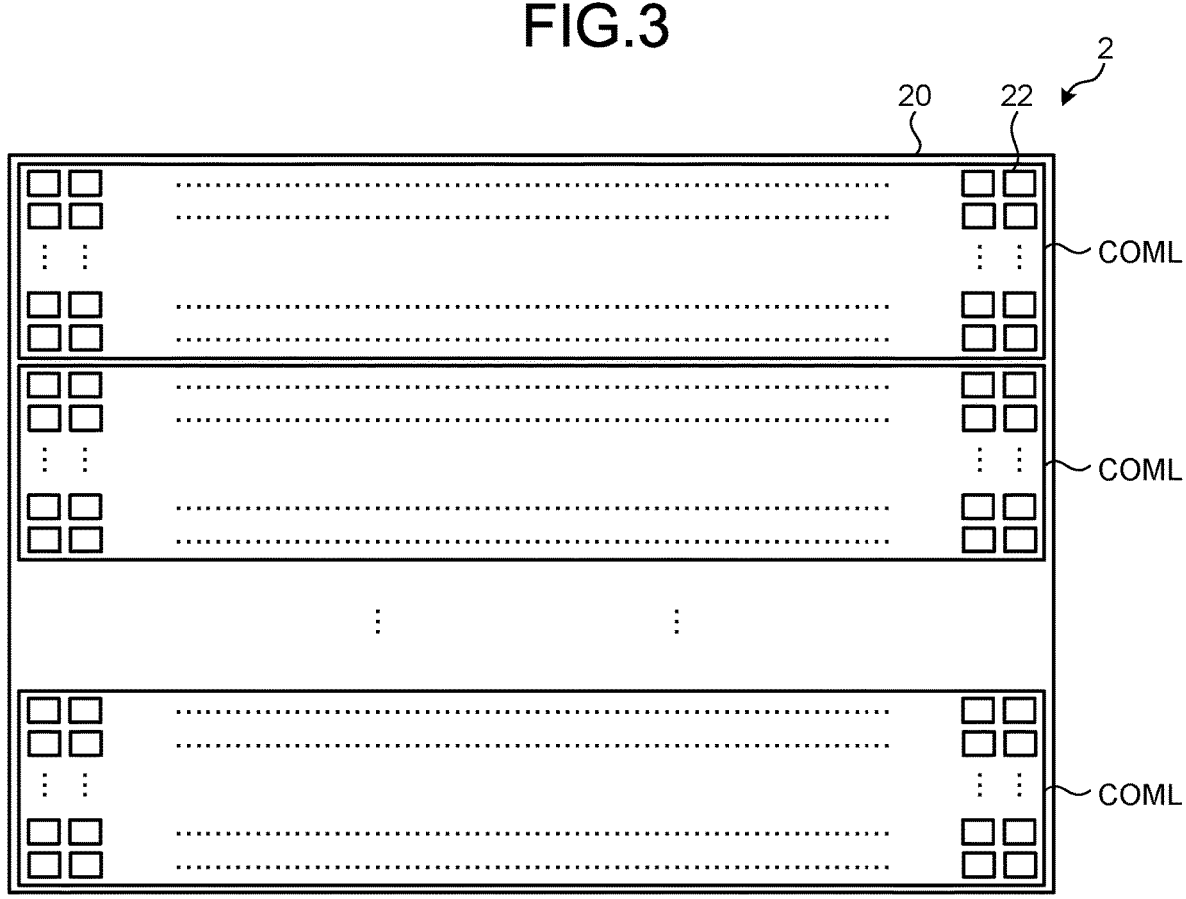
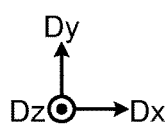

FIG.8
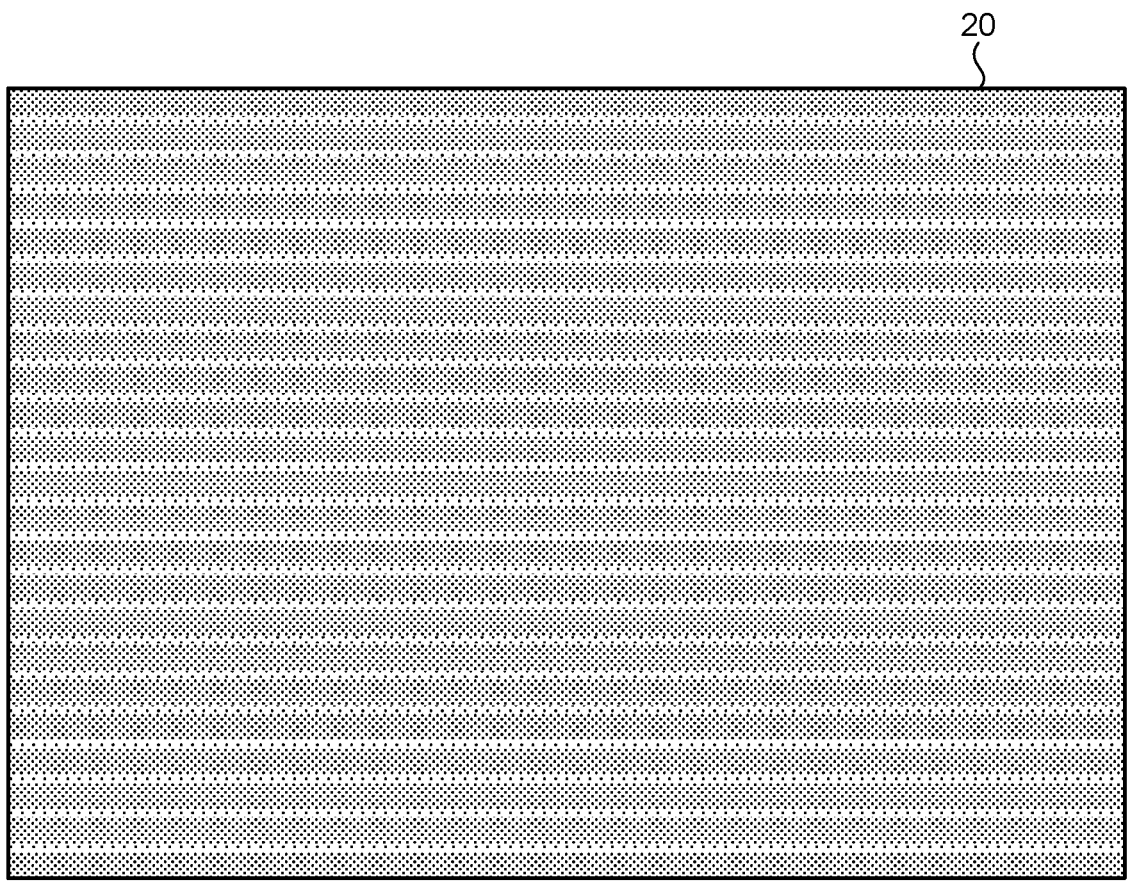
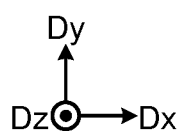

DISPLAY DEVICE

CROSS-REFERENCE TO RELATED APPLICATION

The present application is a continuation of U.S. patent application Ser. No. 17/213,935, filed on Mar. 26, 2021, which is a continuation of International Patent Application No. PCT/JP2019/032706, filed on Aug. 21, 2019, which claims the priority benefit from Japanese Patent Application 2018-184924, filed on Sep. 28, 2018, the entire contents of which are hereby incorporated by reference.

BACKGROUND

1. Technical Field

The present disclosure relates to a display device.

2. Description of the Related Art

In recent years, a touch detection device capable of detecting an external proximity object, what is called a touch panel, has attracted attention. The touch panel is mounted on or integrated with a display device such as a liquid crystal display device and is used as a display device. In a configuration in which the touch panel is integrated with a display device, it is known that there is a configuration in which a drive electrode for display is divided and shared as a drive electrode for touch detection.

In displaying with the above-mentioned conventional technology, an electric influence between a drive electrode and pixels near a boundary of drive electrodes may be different from an electric influence between a drive electrode and pixels other than the pixels near a boundary of drive electrodes. Thus, luminance difference occurs on a display screen, and display quality may reduce.

For the foregoing reasons, there is a need for a display device capable of suppressing reduction in display quality.

SUMMARY

According to an aspect, a display device includes: a plurality of pixel electrodes including a first pixel electrode and a second pixel electrode adjacent to the first pixel electrode in a first direction; a plurality of switching elements including a first switching element coupled to the first pixel electrode and a second switching element coupled to the second pixel electrode; a plurality of gate lines including a first gate line coupled to the first switching element and a second gate line coupled to the second switching element, and extending in a second direction intersecting the first direction; a gate driver configured to supply a gate signal to the gate lines; and a plurality of drive electrodes including a first drive electrode and a second drive electrode adjacent to the first drive electrode in the first direction. The first drive electrode overlaps with the first pixel electrode, the second pixel electrode, and the second gate line. The second drive electrode overlaps with the first gate line. The gate driver is configured to supply the gate signal to the first gate line and the second gate line simultaneously.

According to an aspect, a display device includes: a plurality of pixels arranged in a first direction and a second direction; a gate driver configured to drive the pixels arranged in the second direction through gate lines; a source driver configured to supply pixel signals to the pixels arranged in the first direction through signal lines; and a plurality of drive electrodes arranged in the first direction. The pixels include a first pixel and a second pixel adjacent to the first pixel, the drive electrodes include a first drive electrode and a second drive electrode adjacent to the first drive electrode, the gate lines include a first gate lines and a second gate line, the gate driver is configured to drive the first pixel and the second pixel simultaneously, the first pixel is a pixel in which a first pixel electrode overlaps with the first drive electrode and the first gate line overlaps with the second drive electrode, and the second pixel is a pixel in which a second pixel electrode and the second gate line overlap with the first drive electrode.

BRIEF DESCRIPTION OF THE DRAWINGS

FIG. 2 is a cross-sectional view illustrating a schematic cross-sectional structure of the display device according to the embodiment;

FIG. 3 is a plan view schematically illustrating a TFT substrate included in the display device according to the embodiment;

FIG. 8 is a diagram illustrating an image display example in the first drive method;

DETAILED DESCRIPTION

Embodiments for carrying out the present disclosure are described in detail with reference to the drawings. The present disclosure is not limited by contents described in the following embodiments. Components described below include the ones that can be easily conceived by a person skilled in the art and the ones that are substantially the same. The components described below can be combined as appropriate. What is disclosed herein is merely an example, and it should be understood that appropriate modifications within the gist of the present disclosure that could be easily conceived by a person skilled in the art are included in the scope of the present disclosure. For clearer description, the drawings sometimes schematically illustrate the widths, thicknesses, and shapes of units as compared with the actual forms, which are merely an example and do not limit the interpretation of the present disclosure. In the present specification and the drawings, the same elements as those already described are sometimes denoted by the same reference symbols, and detailed descriptions thereof are omitted as appropriate.

In this disclosure, when an element is described as being "on" another element, the element can be directly on the other element, or there can be one or more elements between the element and the other element.

Figure 1:
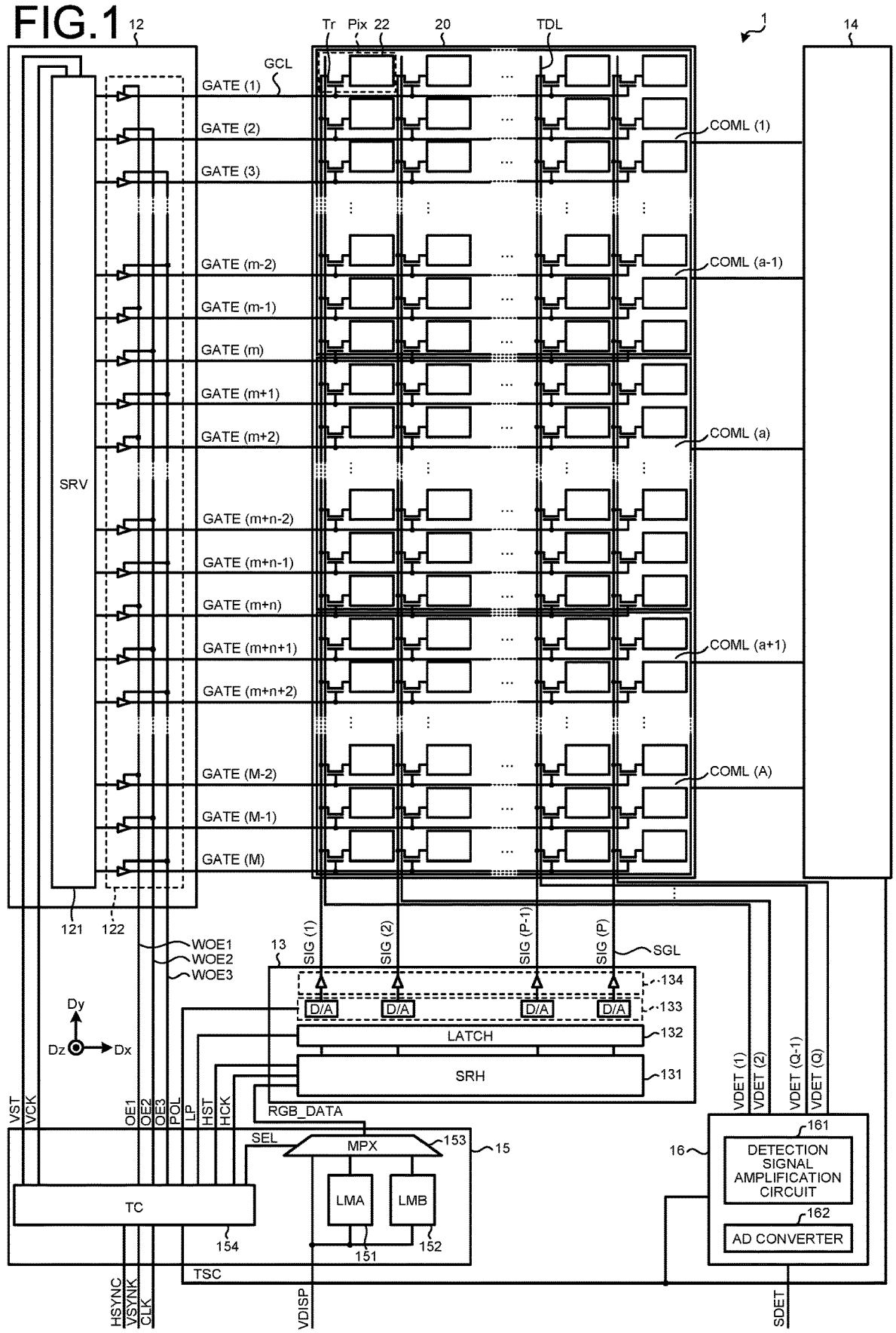
FIG. 1 is a block diagram illustrating a configuration example of a display device according to an embodiment.

FIG. 1 is a block diagram illustrating a configuration example of a display device according to an embodiment. As illustrated in FIG. 1, a display device 1 includes a display region 20 in which a plurality of pixels Pix are arranged in a row direction (Dx direction) (second direction) and a column direction (Dy direction) (first direction), a gate driver 12, a source driver 13, a drive electrode driver 14, a timing controller 15, and a detection circuit 16. FIG. 1 illustrates some of the pixels Pix, but the pixels Pix are disposed over the entire display region 20.

The display device 1 is what is called an in-cell type device in which a capacitive touch sensor is integrated in the display region 20 for displaying images. Examples of the incorporating and integrating of a capacitive touch sensor in the display device 1 include, but are not limited to, causing some of members in the display region 20 such as a substrate and an electrode to double as some of members to be used as a touch sensor such as a substrate and an electrode. In the example illustrated in FIG. 1, some of components of the touch sensor are omitted.

Each of the pixels Pix includes a pixel electrode 22 and a switching element Tr. The switching element Tr includes a thin film transistor and is includes, for example, an n-channel metal oxide semiconductor (MOS) TFT. One of a source and a drain of the switching element Tr is coupled to a corresponding one of signal lines SGL, a gate thereof is coupled to a corresponding one of gate lines GCL, and the other of the source and the drain is coupled to the pixel electrode 22.

The pixel Pix is coupled to other pixels Pix arranged in the row direction (Dx direction) through the corresponding gate line GCL. The gate lines GCL are coupled to the gate driver 12 and are supplied with gate signals GATE(1, 2, . . . , M) from the gate driver 12.

The pixel Pix is coupled to other pixels Pix arranged in the column direction (Dy direction) through the corresponding signal line SGL. The signal lines SGL are coupled to the source driver 13 and are supplied with pixel signals SIG(1, 2, . . . , P) from the source driver 13.

The display region 20 is provided with a plurality of drive electrodes COML(1, . . . , a−1, a, . . . , A) extending in the row direction (Dx direction) along the gate lines GCL. The drive electrodes COML(1, . . . , a−1, a, . . . , A) overlap with the display region 20 when viewed in a direction (Dz direction) orthogonal to the row direction (Dx direction) and the column direction (Dy direction).

The timing controller 15 includes a first line memory 151, a second line memory 152, a multiplexer 153, and a timing pulse supplier 154 (TC). The timing controller 15 is a circuit for controlling the gate driver 12 and the source driver 13 based on image data VDISP, a horizontal synchronization signal HSYNC, a vertical synchronization signal VSYNC, and a clock signal CLK input from the outside. The image data VDISP is, for example, 8-bit parallel data of R signals, G signals, and B signals. The timing controller 15 is a circuit for controlling touch detection timing by supplying a detection control signal TSC to the detection circuit 16 and the drive electrode driver 14.

The first line memory 151 (LMA) and the second line memory 152 (LMB) are line memories for fetching image data VDISP for each horizontal line. As the first line memory 151 and the second line memory 152, for example, a 1-port random-access memory (RAM) can be used, but a single 2-port RAM may be used.

In accordance with an image data selection signal SEL output from the timing pulse supplier 154, the multiplexer 153 selects one of image data VDISP, reading data from the first line memory 151, and reading data from the second line memory 152, and outputs the selected data as image data RGB_DATA for each horizontal cycle.

The timing pulse supplier 154 supplies a vertical start pulse VST, a clock pulse VCK, gate signal output permission signals OE1, OE2, and OE3, a polarity inversion signal POL, a latch control signal LP, a horizontal start pulse HST, a clock pulse HCK, and an image data selection signal SEL. The clock pulse VCK is a pulse signal synchronized with one horizontal cycle. The clock pulse HCK is a pulse signal synchronized with a dot clock.

The gate driver 12 includes a shift register 121 (SRV) and a gate signal output circuit 122. The gate driver 12 is a circuit for supplying the gate signals GATE(1, 2, . . . , M) to the gates of switching elements Tr in the pixels Pix in the 1st, 2nd, . . . , and the M-th rows through gate lines GCL.

The shift register 121 shifts the vertical start pulse VST at each horizontal cycle using the clock pulse VCK and outputs pulses corresponding to the pixels Pix in the 1st, 2nd, . . . , and the M-th rows.

The gate signal output circuit 122 outputs the gate signals GATE(1, 2, . . . , M) corresponding to the pixels Pix in the 1st, 2nd, . . . , and the M-th rows from the output pulses of the shift register 121 based on the gate signal output permission signals OE1, OE2, and OE3.

The source driver 13 includes a shift register 131 (SRH), a latch 132 (LATCH), a Digital-to-Analog (DA) converter 133 (D/A), and a source signal output circuit 134. The source driver 13 is a circuit for supplying pixel signals SIG(1, 2, . . . , P) to either sources or drains of switching elements Tr in the pixels Pix through the signal lines SGL. The source driver 13 supplies the pixel signals SIG(1, 2, . . . , P) simultaneously to the pixels Pix in each of the 1st, 2nd, . . . , M-th rows. In other words, the source driver 13 supplies the pixel signals SIG simultaneously to a plurality of pixels Pix coupled to the same gate line. Hereinafter, the pixel signals SIG(1, 2, . . . , P) that are simultaneously supplied to the pixels Pix in the x-th row (x is a natural number from 1 to M) are sometimes collectively referred to as a "pixel signal group SIGx".

The shift register 131 shifts the horizontal start pulse HST using the dot clock based on the clock pulse HCK and time-divides image data RGB_DATA into a plurality of pieces of data to output image data corresponding to the pixels Pix in the 1st, 2nd, . . . , and the P-th columns. The latch 132 holds image data output from the shift register 131 and outputs the image data to the DA converter 133 based on a latch control signal LP.

The DA converter 133 converts the image data output from the latch 132 into an analog signal based on the polarity inversion signal POL. The source signal output circuit 134 outputs a pixel signal group SIGx (pixel signals SIG(1, 2, . . . , P)) converted into analog signals by the DA converter 133.

The drive electrode driver 14 is a circuit for supplying a drive signal Vcomdc for display or a drive signal Vcom for touch detection to the drive electrodes COML(1, . . . , a−1, a, a+1, . . . , A). For example, the drive electrode driver 14 supplies one of the drive signal Vcomdc for display and the drive signal Vcom for touch detection to the drive electrodes COML in a time division manner based on the detection control signal TSC from the timing controller 15. The touch detection electrodes TDL extend in the column direction (Dy direction) in the display region 20 and are coupled to the detection circuit 16. The detection circuit 16 receives detection signals VDET(1, 2, . . . , Q−1, Q) supplied from the touch detection electrodes TDL based on a detection control signal TSC from the timing controller. The detection circuit 16 includes a detection signal amplification circuit 161 for amplifying the detection signals VDET(1, 2, . . . , Q−1, Q) and an Analog-to-Digital (AD) converter 162 for converting the detection signals VDET(1, 2, . . . , Q−1, Q) into digital signals. The detection circuit 16 outputs a detection signal SDET through the detection signal amplification circuit 161 and the AD converter 162. The detection circuit 16 is not necessarily required to include the detection signal amplification circuit 161 and the AD converter 162, and may output each of the detection signals VDET(1, 2, . . . , Q−1, Q) supplied from the touch detection electrode TDL directly as the detection signal SDET.

The gate driver 12, the source driver 13, the drive electrode driver 14, the timing controller 15, and the detection circuit 16 may be formed by individual devices (ICs) or may be formed by one or a plurality of devices (ICs) in which the above-mentioned functions are integrated. As described later, the gate driver 12, the source driver 13, the drive electrode driver 14, the timing controller 15, and the detection circuit 16 may be directly formed as circuits on a TFT substrate on which switching elements Tr are formed. The present disclosure is not limited by the configurations of the gate driver 12, the source driver 13, the drive electrode driver 14, and the timing controller 15.

Figure 4:
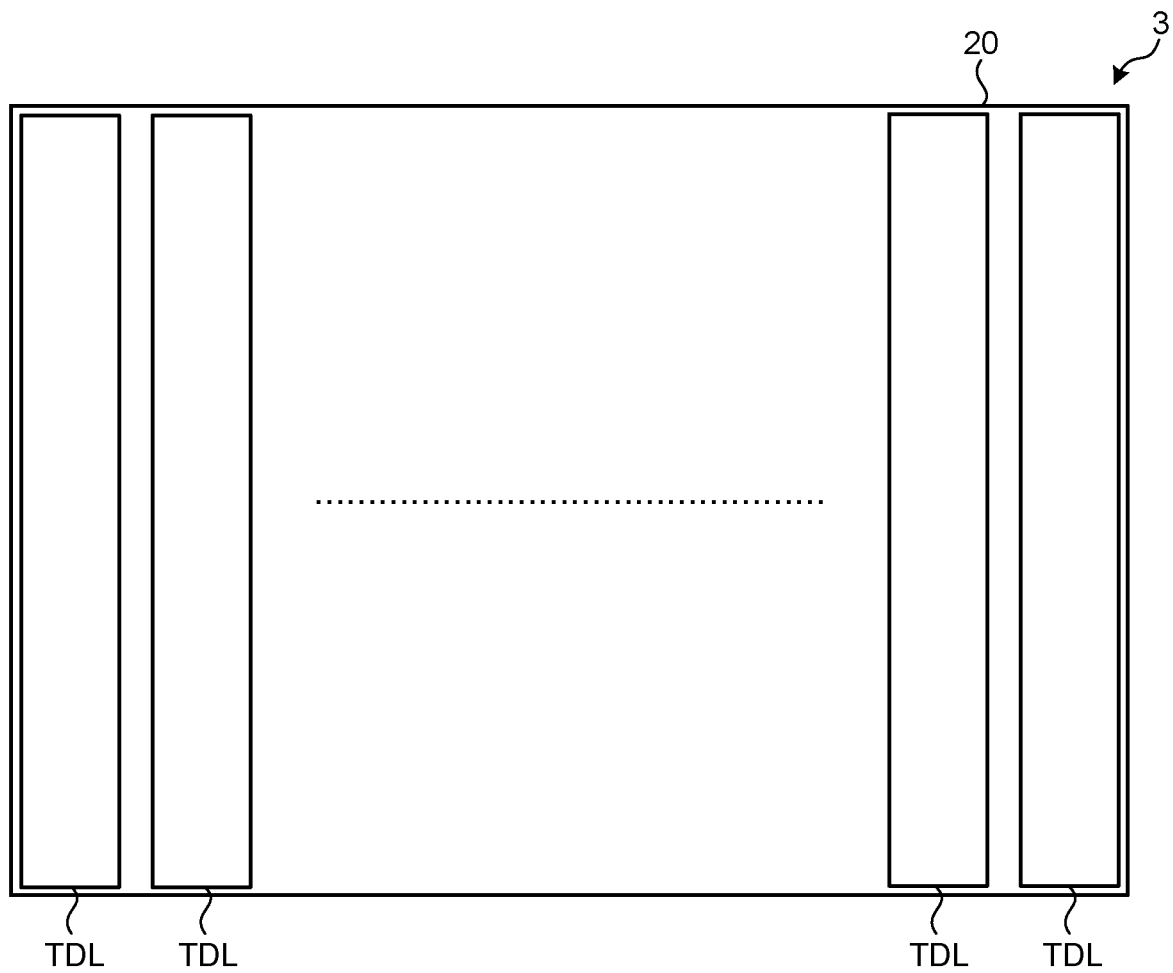
FIG. 4 is a plan view schematically illustrating a counter substrate included in the display device according to the embodiment.

Next, the schematic structure of the display device 1 according to the embodiment is described with reference to FIG. 2 to FIG. 4. FIG. 2 is a cross-sectional view illustrating the schematic cross-sectional structure of the display device according to the embodiment. FIG. 3 is a plan view schematically illustrating a TFT substrate included in the display device according to the embodiment. FIG. 4 is a plan view schematically illustrating a counter substrate included in the display device according to the embodiment.

As illustrated in FIG. 2, the display device 1 includes a pixel substrate 2, a counter substrate 3 disposed so as to be opposed to the pixel substrate 2 in a direction perpendicular to the surface of the pixel substrate 2, and a liquid crystal layer 6 inserted between the pixel substrate 2 and the counter substrate 3.

As illustrated in FIG. 2 and FIG. 3, the pixel substrate 2 includes a thin film transistor (TFT) substrate 21 as a circuit substrate, the pixel electrodes 22, the drive electrodes COML, and an insulating layer 24 that insulates the pixel electrodes 22 and the drive electrodes COML from each other. The pixel electrodes 22 are provided above the TFT substrate 21 in a matrix (row-column configuration). The drive electrodes COML are provided between the TFT substrate 21 and the pixel electrode 22. A polarizing plate 35B is provided on the lower side of the TFT substrate 21 with an adhesive layer (not illustrated) therebetween. Although not illustrated, the switching elements Tr, the gate lines GCL, and the signal lines SGL are disposed between the drive electrodes COML and the TFT substrate 21 at positions corresponding to the pixel electrodes. The arrangement positions of the pixel electrodes 22 and the drive electrodes COML are not limited thereto, and the pixel electrodes 22 may be disposed between the drive electrodes COML and the TFT substrate 21. Either the pixel electrodes 22 or the drive electrodes COML may be disposed on a counter substrate 31.

As illustrated in FIG. 3, the drive electrodes COML are provided in a display region 20 of the TFT substrate 21. More specifically, the drive electrodes COML extending in a direction (Dx direction) along the long sides of the display region 20 are arranged in a direction (Dy direction) along the short sides of the display region 20. Each of the drive electrodes COML is rectangular in plan view. For example, the drive electrode COML is made of conductive material having translucency, such as indium tin oxide (ITO). More than one pixel electrode 22 is disposed in a matrix (row-column configuration) at positions corresponding to one drive electrode COML. The pixel electrode 22 has an area smaller than that of the drive electrode COML. FIG. 3 illustrates some of the drive electrodes COML and the pixel electrodes 22, but the drive electrodes COML and the pixel electrodes 22 are disposed over the entire display region 20.

As illustrated in FIG. 2, the counter substrate 3 includes the counter substrate 31 and a color filter 32 formed on one surface of the counter substrate 31. The other surface of the counter substrate 31 is provided with touch detection electrodes TDL of a touch sensor 30. A polarizing plate 35A is provided on the touch detection electrodes TDL with an adhesive layer (not illustrated) therebetween. The color filter 32 may be disposed on the TFT substrate 21 rather than the counter substrate 31.

As illustrated in FIG. 2, the TFT substrate 21 and the counter substrate 31 are disposed so as to be opposed with a predetermined gap therebetween. The liquid crystal layer 6 as a display functional layer is provided in a space between the TFT substrate 21 and the counter substrate 31. The liquid crystal layer 6 modulates light transmitted through the liquid crystal layer 6 depending on the state of electric field. For example, liquid crystal that supports a transverse field mode such as in-plane switching (IPS) including fringe field switching (FFS) is used. In a case where either the pixel electrodes 22 or the drive electrodes COML are disposed on the counter substrate 31, liquid crystal that supports a longitudinal field mode such as vertical alignment (VA) and twisted nematic (TS) may be used. Orientation films may be provided between the liquid crystal layer 6 and the pixel substrate 2 and between the liquid crystal layer 6 and the counter substrate 3 illustrated in FIG. 2.

As illustrated in FIG. 4, the touch detection electrodes TDL are provided in the display region 20 of the counter substrate 31. More specifically, the touch detection electrodes TDL extending in the direction (Dy direction) along the short sides of the display region 20 are arranged in the direction (Dx direction) along the long sides of the display region 20. Each of the touch detection electrodes TDL is rectangular in plan view. For example, the touch detection electrode TDL is made of conductive material having translucency, such as indium tin oxide (ITO). The touch detection electrode TDL is not limited to ITO, and, for example, may be made of metal thin wiring using metal material. FIG. 4 illustrates some of the touch detection electrodes TDL, but the touch detection electrodes TDL are disposed over the entire display region 20.

With the above-mentioned configuration, a touch detection surface is provided over the entire display region 20. When an object to be detected becomes closer to or touches the touch detection surface, electrostatic capacitance between the touch detection electrode TDL and the drive electrode COML that intersect with each other changes. In the touch detection, the drive signal Vcom for touch detection illustrated in FIG. 1 are sequentially supplied from the drive electrode driver 14 to each of the drive electrodes COML(1, . . . , a−1, a, a+1, . . . , A) in a time division manner, and change in the detection signal output from the touch detection electrodes TDL are detected, whereby a position on the touch detection surface where the object to be detected is in proximity to or in contact with, can be detected.

Figure 5:
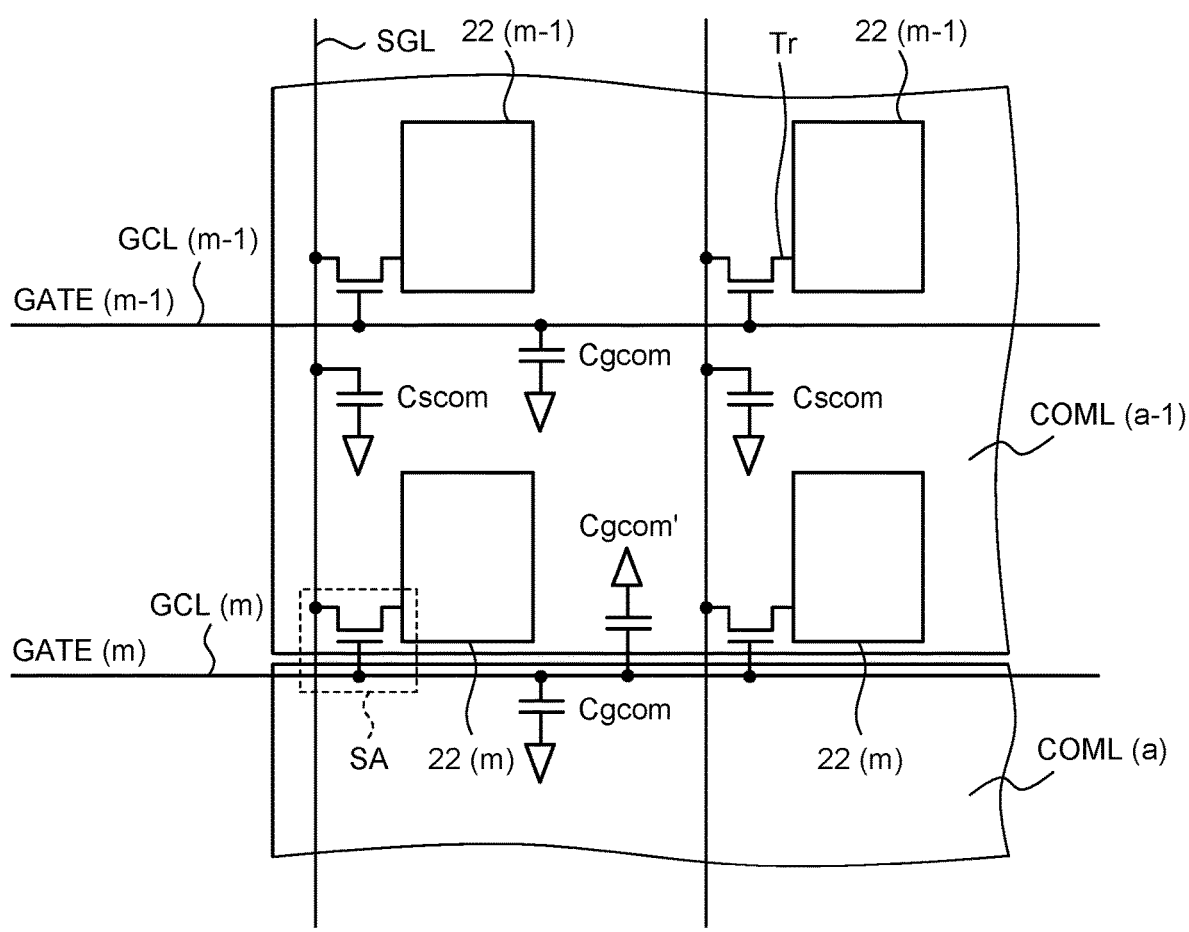
FIG. 5 is an enlarged view of a portion near a boundary of drive electrodes in the display device according to the embodiment.

FIG. 5 is an enlarged view of a portion near a boundary of the drive electrodes in the display device according to the embodiment. The example illustrated in FIG. 5 illustrates an enlarged view near a boundary between a drive electrode COML(a−1) and a drive electrode COML(a).

As illustrated in FIG. 5, in each pixel Pix in the m-th row that is located at a boundary between the drive electrode COML(a−1) and the drive electrode COML(a), the gate line GCL(m) coupled to the switching element Tr in each pixel Pix in the m-th row overlaps with the drive electrode COML(a), and the pixel electrode 22(m) coupled to the switching element Tr in each pixel Pix in the m-th row overlaps with the drive electrode COML(a−1). On the other hand, in each pixel Pix in the (m−1)th row, both of the gate line GCL(m−1) and the pixel electrode 22(m−1) that are coupled to the switching element Tr in each pixel Pix in the (m−1)th row overlap with the drive electrode COML(a−1). In other words, in some pixels Pix near a boundary of the drive electrodes COML, the gate line GCL and the pixel electrode 22 that are coupled to the switching element Tr in the same pixel Pix are disposed so as to overlap with different drive electrodes COML.

To improve the aperture ratio of the pixel Pix, as described above, it is desired that the gate line GCL and the pixel electrode 22 overlap with different drive electrodes in each pixel Pix located at a boundary of two drive electrodes COML. More specifically, as illustrated in FIG. 5, each pixel electrode 22 is coupled to the gate line GCL through the switching element Tr. A region SA in which the switching element Tr is provided is a region in which various kinds of connection wiring and a semiconductor layer are disposed and the aperture ratio reduces. The boundary region of drive electrodes COML is a region in which the drive signal Vcomdc for display from the drive electrode COML is not supplied, which less contributes to the display. Thus, it is desired that the boundary region of the drive electrodes COML and the region SA in which the switching element Tr is provided overlap with each other as much as possible. However, the gate line GCL is wiring located at an outer end, which is closer to an adjacent pixel Pix, of each region SA in which the switching element Tr is provided, and hence when the gate line GCL and the pixel electrode 22 are disposed so as to overlap one drive electrode COML, the overlapping area of the region SA in which the switching element is provided and the boundary region of the drive electrodes COML decreases, and as a result, the aperture ratio reduces. On the other hand, in each pixel Pix located at a boundary of two drive electrodes COML, when the gate line GCL and the pixel electrode 22 overlap with different drive electrodes, the overlapping area of the region SA in which the switching element is provided and the boundary region of the drive electrodes COML can be increased, and as a result, the aperture ratio can be improved.

Figure 6:
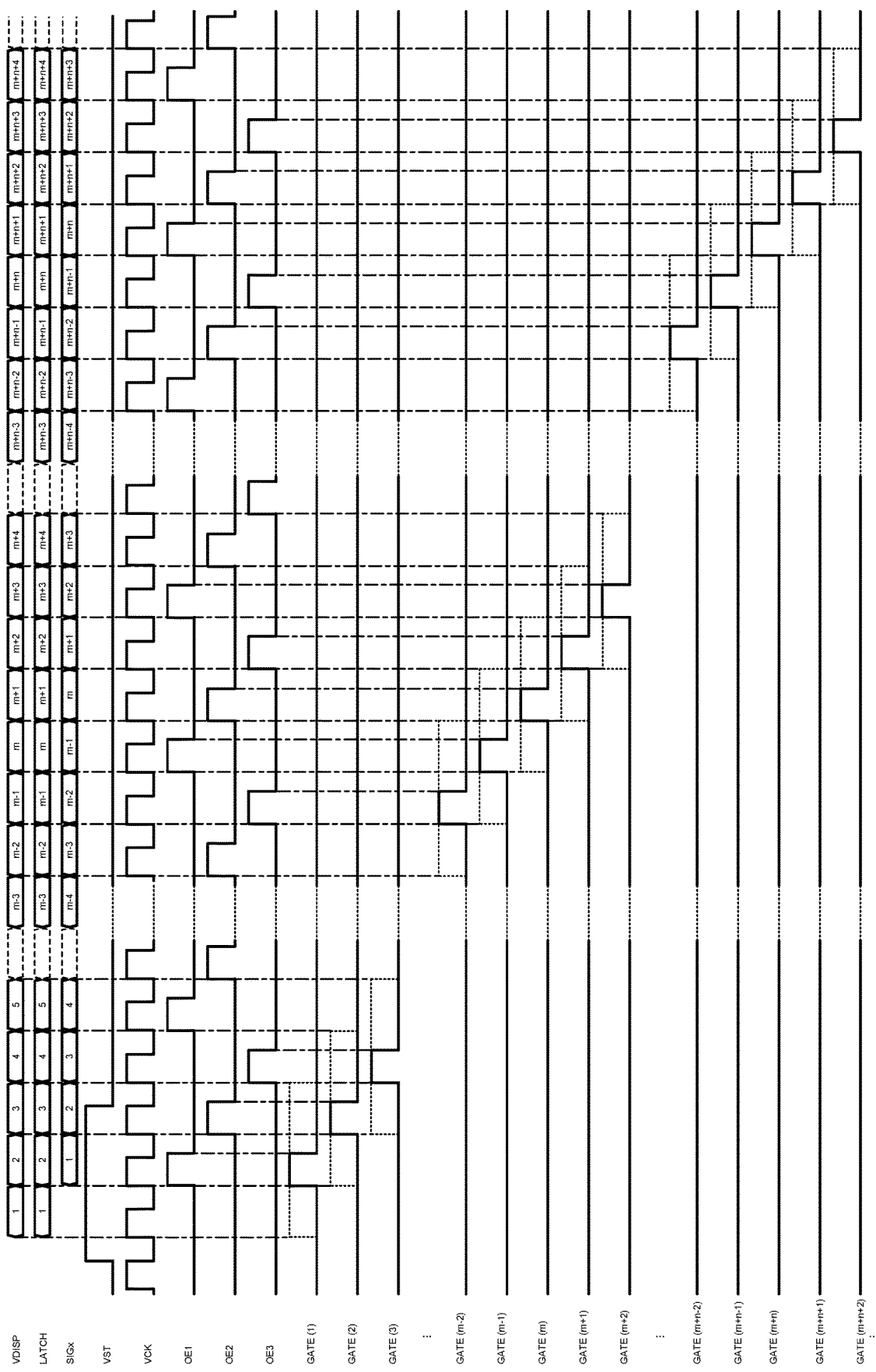
FIG. 6 is a diagram illustrating an example of a timing chart related to a first drive method.

FIG. 6 is a diagram illustrating an example of a timing chart related to a first drive method. FIG. 6 illustrates an example in which the pixels Pix in the first row to the pixels Pix in the M-th row are sequentially driven in one frame period. In other words, in the first drive method, the gate driver 12 supplies the gate signal GATE to the gate lines GCL in order along the arrangement direction (Dy direction).

As illustrated in FIG. 6, in the display device 1 according to the embodiment, a high period of the vertical start pulse VST in which the vertical pulse is high, corresponds to three periods of the clock pulse VCK synchronized with one horizontal cycle. The vertical start pulse VST is shifted by the clock pulse VCK in one horizontal cycle, and hence a high period of the output pulse, in which the output pulse is high, of the shift register 121 corresponding to each gate line GCL correspond to three horizontal cycles.

The high period of the output pulse of the shift register 121 is indicated by a broken line in each gate signal GATE(x) illustrated in FIG. 6. In the high period of the output pulse of the shift register 121, the gate driver 12 outputs the gate signals GATE(x) the timings of which are controlled based on the gate signal output permission signals OE1, OE2, and OE3 by the gate signal output circuit 122.

In the first drive method illustrated in FIG. 6, the multiplexer 153 outputs image data VDISP as image data RGB_DATA in all horizontal periods. The source driver 13 holds the input image data RGB_DATA by the latch 132, and then supplies the data as the pixel signal group SIGx (pixel signals SIG(1, 2, . . . , P)) corresponding to the pixels Pix in the x-th row through the DA converter 133 and the source signal output circuit 134.

In the first drive method illustrated in FIG. 6, the gate driver 12 sequentially drives the pixels Pix in the first row to the pixels Pix in the M-th row. In other words, the gate signals GATE(1, 2, . . . , M) of high level are supplied in order from a gate line GCL(1) corresponding to the pixels Pix in the first row to a gate line GCL(M). The source driver 13 sequentially supplies the pixel signal group SIGx (pixel signals SIG(1, 2, . . . , P)) corresponding to the pixels Pix in the x-th row driven by the gate driver 12. In this manner, an image corresponding to one frame is displayed.

The image data VDISP is supplied in the order from image data VDISP(1) corresponding to the pixels Pix in the first row to image data VDISP(M) corresponding to the pixels Pix in the M-th row. In the first drive method illustrated in FIG. 5, image data is output in the order from image data RGB_DATA(1) corresponding to the image data VDIP(1) to RGB_DATA(M) corresponding to the image data VDISP(M), and hence the first line memory 151 and the second line memory 152 may be omitted. In the first drive method, in order for the gate driver 12 to sequentially drive the gate line GCL(1) to the gate line GCL(M) in order, the high period of the vertical start pulse VST may be a period corresponding to one cycle of the clock pulse VCK synchronized with one horizontal cycle and may be controlled only by the output pulse of the shift register 121 without providing the gate signal output circuit 122.

Next, a holding potential of a pixel electrode in a case where the pixels Pix in each row are sequentially driven by the first drive method like the timing chart illustrated in FIG. 5 is described.

Figure 7A:
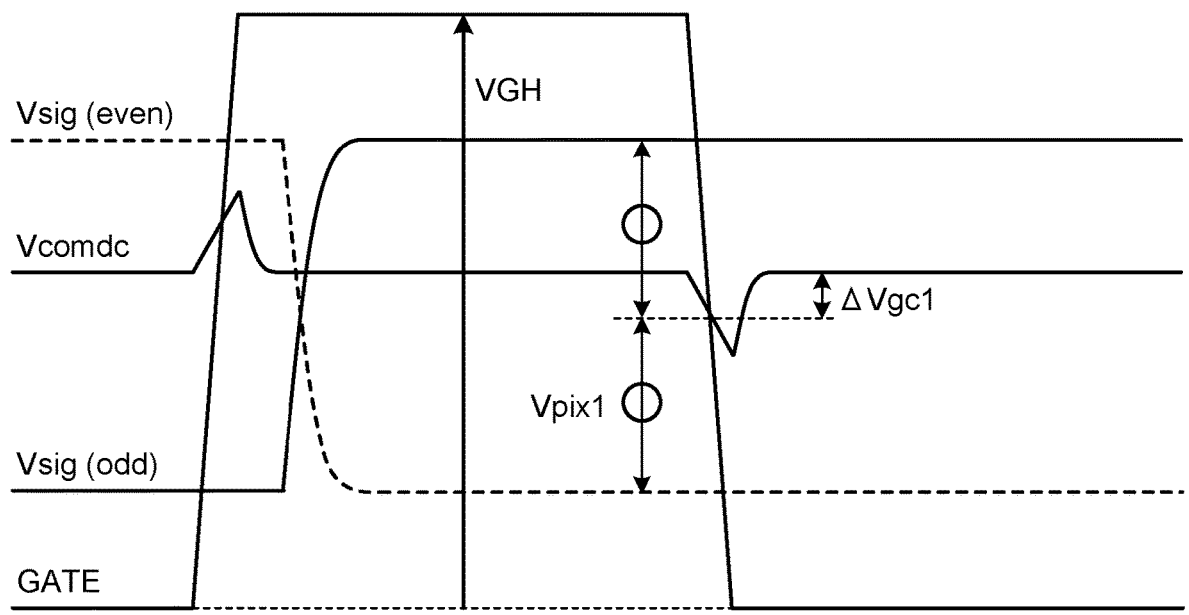
FIG. 7A is a diagram for describing a holding potential of a pixel electrode in a pixel in which a gate line and the pixel electrode overlap with the same drive electrode in the first drive method.
Figure 7B:
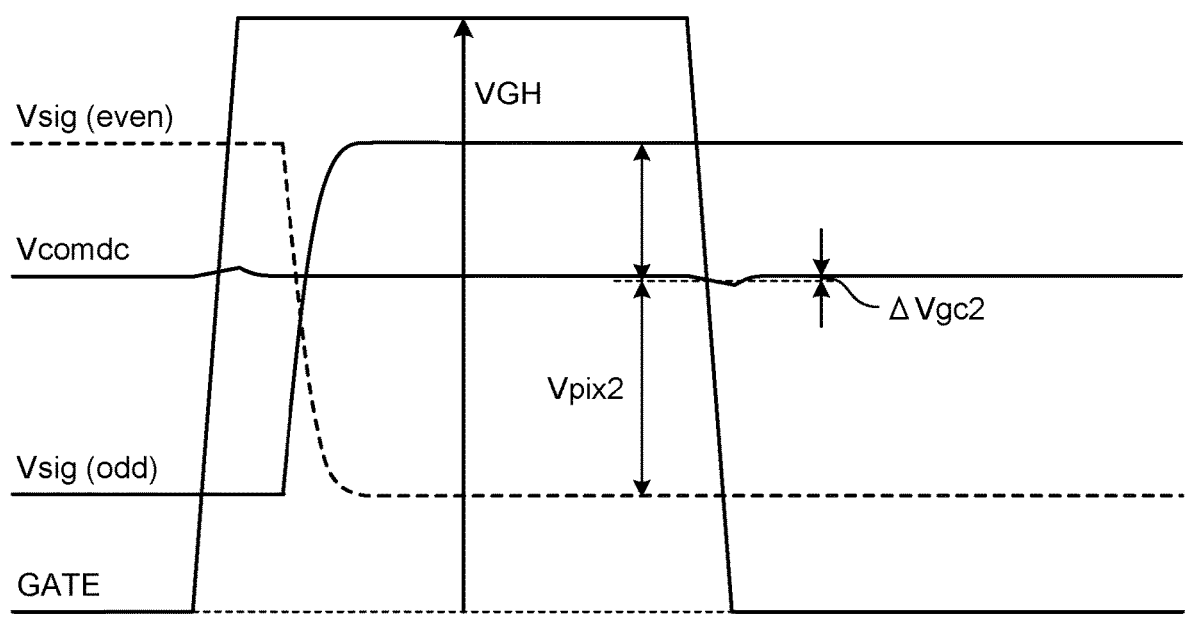
FIG. 7B is a diagram for describing a holding potential of a pixel electrode in a pixel in which a gate line and the pixel electrode overlap with different drive electrodes in the first drive method.

FIG. 7A is a diagram for describing the holding potential of a pixel electrode in a pixel Pix in which a gate line and the pixel electrode overlap with the same drive electrode in the first drive method. FIG. 7B is a diagram for describing the holding potential of a pixel electrode in a pixel Pix in which a gate line and the pixel electrode overlap with different drive electrodes in the first drive method. FIG. 8 is a diagram illustrating an image display example in the first drive method.

The example illustrated in FIG. 7A illustrates a diagram for describing a holding potential of a pixel electrode in a pixel in the (m−1)th row in the first drive method, and the example illustrated in FIG. 7B illustrates a diagram for describing a holding potential of a pixel electrode in a pixel in the m-th row in the first drive method.

In the examples illustrated in FIG. 7A and FIG. 7B, Vsig(odd) represents a potential of a pixel signal SIG supplied to a pixel Pix in an odd-numbered column, Vsig (even) represents a potential of a pixel signal SIG supplied to a pixel Pix in an even-numbered column, VGH represents a high potential of the gate signal GATE, Vpix represents a pixel potential, and ΔVgc1 and ΔVgc2 represent variation amounts of the pixel potential.

The potential applied to the pixel Pix is inverted by the multiplexer 153 for each vertical period (one frame). More specifically, in FIG. 7A and FIG. 7B, the potential Vsig(odd) of a pixel signal supplied to the pixel Pix in the odd-numbered column has a potential higher than that of the drive signal Vcomdc for display, and the potential Vsig (even) of a pixel signal supplied to pixel Pix in the even-numbered column has a potential lower than that of the drive signal Vcomdc for display, but in the next one vertical period, the pixel signal SIG is supplied such that the potential with respect to the drive signal Vcomdc for display is inverted such that the potential Vsig(odd) has a potential lower than that of the drive signal Vcomdc for display and the potential Vsig(even) has a potential higher than that of the drive signal Vcomdc for display. The case is exemplified in which the pixel signal that is inverted with respect to the drive signal Vcomdc for display between odd-numbered columns and even-numbered columns is supplied, however the embodiment is not limited thereto. Either one of a pixel signal having a potential higher than the drive signal Vcomdc for display and a pixel signal having a potential lower than the drive signal Vcomdc for display may be supplied to all columns in one vertical period. The drive signal Vcomdc for display may be an alternating current (AC) signal the potential of which is inverted with respect to the pixel signal for each given period (for example, one vertical period).

The drive electrode COML is capacitively coupled to the signal line SGL and the gate line GCL. Thus, as illustrated in FIG. 7A and FIG. 7B, the potential of Vcomdc supplied to the drive electrode COML varies when the gate signal GATE supplied to the gate line GCL is turned on and off. Consequently, the pixel potential Vpix varies. The variation amount ΔVgc of the pixel potential is expressed by the following expression when the capacitance value generated between the signal line SGL and the drive electrode COML is represented by Cscom, the capacitance value generated between the gate line GCL and the drive electrode COML is represented by Cgcom, and a threshold voltage of the switching element Tr is represented by Vth.

$$\Delta Vgc = (Cgcom/(Cscom1 + \ldots + CscomP)) \times (VGH - Vth)$$

In each pixel Pix in the m-th row in which the gate line GCL(m) overlaps with the drive electrode COML(a) and the pixel electrode 22(m) overlaps with the drive electrode COML(a−1), a capacitance value Cgcom(m) generated between the gate line GCL(m) and the drive electrode COML(a−1) is smaller than a capacitance value Cgcom(m−1) generated between the gate line GCL(m−1) and the drive electrode COML(a−1) in each pixel Pix in the (m−1)th row in which both of the gate line GCL(m−1) and the pixel electrode 22(m−1) overlap with the drive electrode COML (a−1). Thus, as illustrated in FIG. 7A and FIG. 7B, the variation amount ΔVgc2 of the pixel potential in each pixel Pix in the m-th row is smaller than the variation amount ΔVgc1 of the pixel potential in each pixel Pix in the (m−1)th row. Specifically, a pixel potential Vpix2 of each pixel in even-numbered columns in the pixels Pix in the m-th row in which the gate line GCL(m) overlaps with the drive electrode COML(a) and the pixel electrode 22(m) overlaps with the drive electrode COML(a−1) is larger than a pixel potential Vpix1 of each pixel in even-numbered columns in the pixels Pix in the (m−1)th row in which both of the gate line GCL(m−1) and the pixel electrode 22(m−1) overlap with the drive electrode COML(a−1). In other words, the pixel potential of each pixel in odd-numbered columns in the pixels Pix in the m-th row is smaller than the pixel potential Vpix in the (m−1)th row. As a result, for example, when the display device 1 is a normally black liquid crystal display panel, in the image display in the display region 20, each pixel Pix in the m-th row that is located at a boundary between the drive electrode COML(a−1) and the drive electrode COML(a) is displayed relatively brighter than other pixels Pix, and as illustrated in FIG. 8, a streak of unevenness occurs in the extending direction of the drive electrodes COML (in the present embodiment, the row direction (Dx direction)), and display quality decreases.

Figure 9:
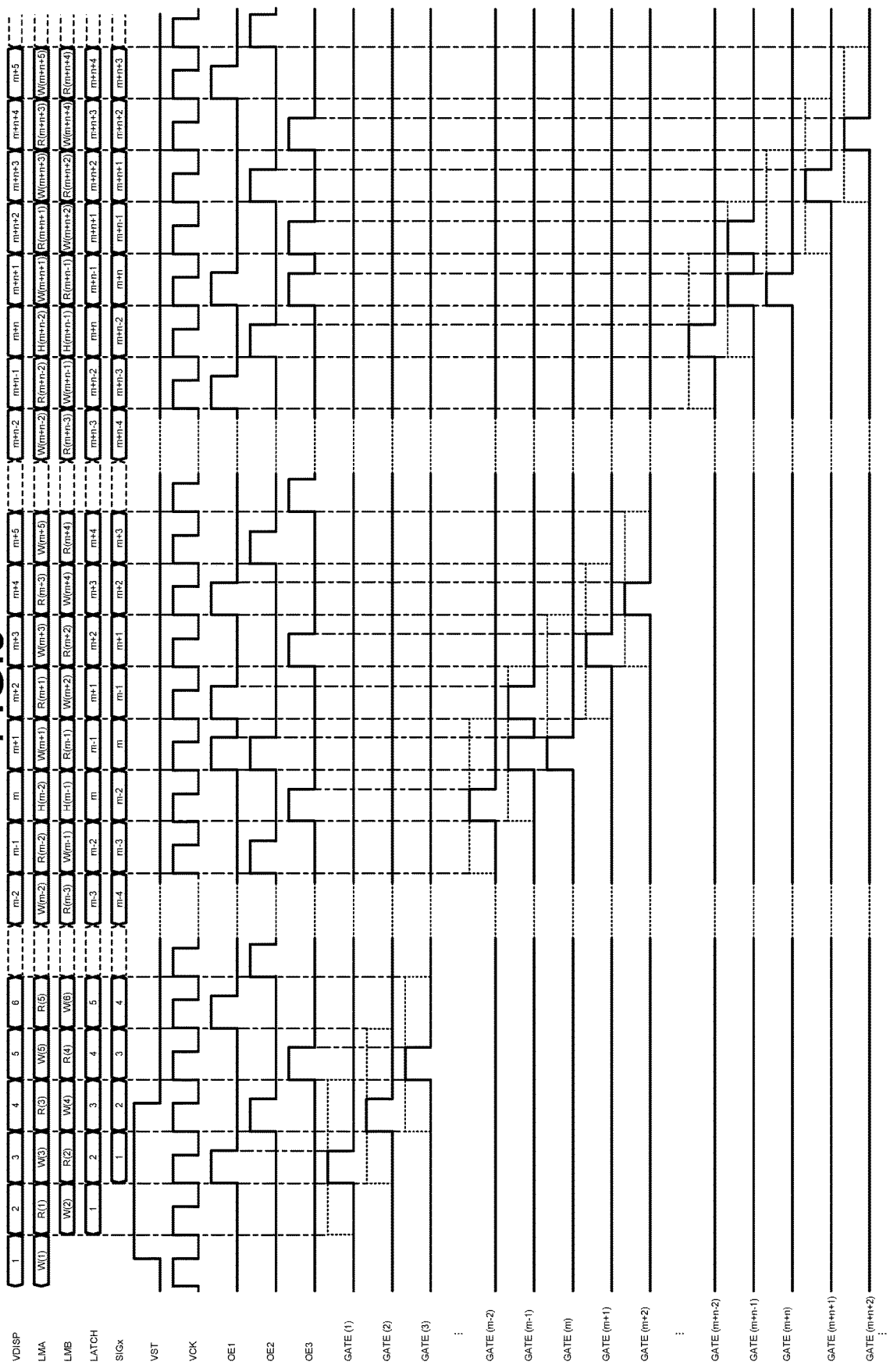
FIG. 9 is a diagram illustrating a timing chart related to a second drive method.

FIG. 9 is a diagram illustrating a timing chart related to a second drive method. Differences from the first drive method illustrated in FIG. 5 are described.

In FIG. 9, W(x) represents writing data of the first line memory 151 or the second line memory 152 in one horizontal period, and R(x) represents reading data of the first line memory 151 or the second line memory 152 in one horizontal period. H(x) represents data held in the first line memory 151 or the second line memory 152 in one horizontal period.

First, in the first one horizontal period H(1) in one frame period, image data VDISP(1) corresponding to the pixels Pix in the first row is written in the first line memory 151 (W(1)).

In a subsequent one horizontal period H(2), image data VDISP(2) corresponding to the pixels Pix in the second row is written in the second line memory 152 (W(2)), the image data VDISP(1) is read from the first line memory 151 (R(1)), and image data RGB_DATA(1) corresponding to the image data VDISP(1) is held in the latch 132.

In a subsequent one horizontal period H(3), the image data RGB_DATA(1) held in the latch 132, which corresponds to the pixels Pix in the first row, is output as a pixel signal group SIGx(1) through the DA converter 133 and the source signal output circuit 134; image data VDISP(3) corresponding to the pixels Pix in the third row is written in the first line memory 151 (W(3)); the image data VDISP(2) is read from the second line memory 152 (R(2)); and image data RGB_DATA(2) corresponding to the image data VDISP(2) is held in the latch 132. In this case, each pixel Pix in the first row is driven by the gate driver 12, and images in the pixels Pix in the first row are displayed.

After that, the writing and reading of image data VDISP are repeated alternatingly in the first line memory 151 and the second line memory 152 for each horizontal period, so that pixel signal group SIGx (pixel signals SIG(1, 2, . . . , P)) corresponding to the pixels Pix in each row are sequentially output, and the pixels Pix in each row are sequentially driven by the gate driver 12.

The above-mentioned operation is repeated until image data VDISP corresponding to the pixels Pix (first pixels) in a row in which the pixel electrodes 22 overlaps with the drive electrode COML(a−1) (first drive electrode) and the gate line GCL overlaps with the drive electrode COML(a) (second drive electrode) is input.

In each pixel Pix(m) (first pixel) in the m-th row, the pixel electrode 22(*m*) overlaps with the drive electrode COML(a−1) (first drive electrode) and the gate line GCL(m) overlaps with the drive electrode COML(a) (second drive electrode). In one horizontal period H(m) during which image data VDISP(m) corresponding to the pixels Pix (first pixels) in the m-th row is to be written, the image data VDISP(m) is not written to and read from the first line memory 151 and the second line memory 152, but is directly held by the latch 132 as image data RGB_DATA(m). In this case, data in the first line memory 151 and the second line memory 152 is held.

In a subsequent one horizontal period H(m+1), the image data RGB_DATA(m) held in the latch 132, which corresponds to the pixels Pix (first pixels) in the m-th row, is output through the DA converter 133 and the source signal output circuit 134 as a pixel signal group SIGx(m) (pixel signals SIG(1, 2, . . . , P) (first pixel signals)), image data VDISP(m−1) held in the second line memory 152, which corresponds to the pixels Pix (second pixels) in the (m−1)th row, is read (R(m−1)), and image data RGB_DATA(m−1) corresponding to the image data VDISP(m−1) is held in the latch 132.

In one horizontal period H(m+1) (first horizontal period), the gate driver 12 simultaneously drives the pixels Pix (first pixels) in the m-th row and the pixels Pix (second pixels) in the (m−1)th row. In other words, the gate driver 12 supplies gate signals GATE(m,m−1) of high level to the gate line GCL(m) coupled to the pixels Pix in the m-th row and the gate line GCL(m−1) coupled to the pixel Pix in the (m−1)th row, respectively. In each pixel Pix (second pixel) in the (m−1)th row, the pixel electrode 22(*m*−1) and the gate line GCL(m−1) overlap with the drive electrode COML(a−1) (first drive electrode).

The variation amount ΔVgc(m) of the pixel potential in each of the pixels Pix in the m-th row when the pixels Pix (first pixels) in the m-th row and the pixels Pix (second pixels) in the (m−1)th row are simultaneously driven in the first horizontal period, can be made substantially equal to the variation amount ΔVgc(m−1) of the pixel potential in each of the pixels Pix in the (m−1)th row when the pixels Pix (second pixels) in the (m−1)th row are driven in the second horizontal period subsequent to the first horizontal period.

In a subsequent one horizontal period H(m+2), the gate driver 12 drives each pixel Pix (second pixel) in the (m−1)th row (second horizontal period). In this case, the image data RGB_DATA(m−1) held in the latch 132, which corresponds to the pixels Pix (second pixels) in the (m−1)th row, is supplied through the DA converter 133 and the source signal output circuit 134 as a pixel signal group SIGx(m−1) (SIG (1, 2, . . . , P) (second pixel signal)); image data VDISP(m+ 1) held in the first line memory 151, which corresponds to the pixels Pix (third pixels) in the (m+1)th row, is read (R(m+1)); and image data RGB_DATA(m+1) corresponding to the image data VDISP(m+1) is held in the latch 132.

In a plurality of horizontal periods (third horizontal periods) before the first horizontal period, the gate driver 12 sequentially drives a plurality of pixels Pix (third pixels) in each of which the pixel electrode 22 and the gate line GCL overlap with the drive electrode COML(a−1) (first drive electrode), in a direction (third direction) from the pixels Pix (second pixels) in the (m−1)th row toward the pixels Pix (first pixels) in the m-th row for each horizontal period. The source driver 13 sequentially supplies the pixel signal group SIGx (SIG(1, 2, . . . , P) (third pixel signals)) corresponding to the pixels Pix (third pixels) in each row driven by the gate driver 12.

In a plurality of horizontal periods (fourth horizontal periods) after the second horizontal period, the gate driver 12 sequentially drives a plurality of pixels Pix (fourth pixels) in each of which the pixel electrode 22 and the gate line GCL overlap with the drive electrode COML(a) (second drive electrode), in a direction (third direction) from the pixels Pix (second pixels) in the (m−1)th row toward the pixels Pix (first pixels) in the m-th row for each horizontal period. The source driver 13 sequentially supplies the pixel signal group SIGx (SIG(1, 2, . . . , P) (fourth pixel signals)) corresponding to the pixels Pix (fourth pixels) in each row driven by the gate driver 12.

Each pixel Pix (first pixel) in the (m+n)th row is a pixel in which the pixel electrode 22 overlaps with the drive electrode COML(a) (first drive electrode) and the gate line GCL overlaps with the drive electrode COML(a+1) (second drive electrode). In one horizontal period H(m+n) during which image data VDISP(m+n) corresponding to the pixels Pix (first pixel) in the (m+n)th row is to be written, the image data VDISP(m+n) is directly held by the latch 132 as image data RGB_DATA(m+n). In this case, data in the first line memory 151 and the second line memory 152 is held.

In a subsequent one horizontal period H(m+n+1), the image data RGB_DATA(m+n) held in the latch 132, which corresponds to the pixels Pix (first pixels) in the (m+n)th row, is output through the DA converter 133 and the source signal output circuit 134 as a pixel signal group SIGx (SIG(m+n)(1, 2, . . . , P) (first pixel signals)); image data VDISP(m+n−1) held in the second line memory 152, which corresponds to the pixels Pix (second pixels) in the (m+n− 1)th row is read (R(m+n−1)); and image data RGB_DATA (m+n−1) corresponding to the image data VDISP(m+n−1) is held in the latch 132.

In the one horizontal period H(m+n+1) (first horizontal period), the gate driver 12 simultaneously drives the pixels Pix (first pixels) in the (m+n)th row and the pixels Pix (second pixels) in the (m+n−1)th row (first horizontal period). In other words, the gate driver 12 supplies gate signals GATE(m+n,m+n−1) of high level to the gate line GCL(m+n) coupled to the pixels Pix in the (m+n)th row and the gate line GCL(m+n−1) coupled to the pixels Pix in the (m+n−1)th row, respectively. In each pixel Pix (second pixel) in the (m+n−1)th row, the pixel electrode 22(*m*+n−1) and the gate line GCL(m+n−1) overlap with the drive electrode COML(a) (first drive electrode).

The variation amount ΔVgc(m+n) of the pixel potential in each of the pixels Pix in the (m+n)th row when the pixels Pix (first pixels) in the (m+n)th row and the pixels Pix (second pixels) in the (m+n−1)th row are simultaneously driven in the first horizontal period, can be made substantially equal to the variation amount ΔVgc(m+n−1) of the pixel potential in each of the pixels Pix in the (m+n−1)th row when the pixels Pix (second pixels) in the (m+n−1)th row are driven.

In a subsequent one horizontal period H(m+n+2), the gate driver 12 drives each pixel Pix (second pixel) in the (m+n− 1)th row (second horizontal period). In this case, the image data RGB_DATA(m+n−1) held in the latch 132, which corresponds to the pixels Pix (second pixels) in the (m+n− 1)th row, is output through the DA converter 133 and the source signal output circuit 134 as a pixel signal group SIGx(m+n−1) (SIG(1, 2, . . . , P) (second pixel signal)); image data VDISP(m+n+1) held in the first line memory 151, which corresponds to the pixels Pix (third pixels) in the (m+n+1)th row, is read (R(m+n+1)); and image data RGB- _DATA(m+n+1) corresponding to the image data VDISP(m+n+1) is held in the latch 132.

In a plurality of horizontal periods (third horizontal periods) before the first horizontal period, the gate driver 12 sequentially drives a plurality of pixels Pix (third pixels) in each of which the pixel electrode 22 and the gate line GCL overlap with the drive electrode COML(a) (first drive electrode), in a direction (third direction) from the pixels Pix (second pixels) in the (m+n−1)th row toward the pixels Pix (first pixels) in the (m+n)th row for each horizontal period. The source driver 13 sequentially supplies the pixel signal group SIGx (SIG(1, 2, . . . , P) (third pixel signals)) corresponding to the pixels Pix (third pixels) in each row driven by the gate driver 12.

In a plurality of horizontal periods (fourth horizontal periods) after the second horizontal period, the gate driver 12 sequentially drives a plurality of pixels Pix (fourth pixels) in each of which the pixel electrode 22 and the gate line GCL overlap with the drive electrode COML(a+1) (second drive electrode), in a direction (third direction) from the pixels Pix (second pixels) in the (m+n−1)th row toward the pixels Pix (first pixels) in the (m+n)th row for each horizontal period. The source driver 13 sequentially supplies the pixel signal groups SIGx (SIG(1, 2, . . . , P) (fourth pixel signals)) corresponding to the pixels Pix (fourth pixels) in each row driven by the gate driver 12.

With the above-mentioned operation, the occurrence of a streak of unevenness on a displayed image can be reduced, and the reduction in display quality can be hampered.

In the example illustrated in FIG. 9, in the second pixel, display based on the first pixel signal corresponding to the first pixel is performed in the first horizontal period, and display based on the second pixel signal corresponding to the second pixel is performed in the second horizontal period subsequent to the first horizontal period. With this operation, the visual recognition that display based on the first pixel signal corresponding to the first pixel is performed at the second pixel can be hampered in the first horizontal period.

Modification

Figure 10:
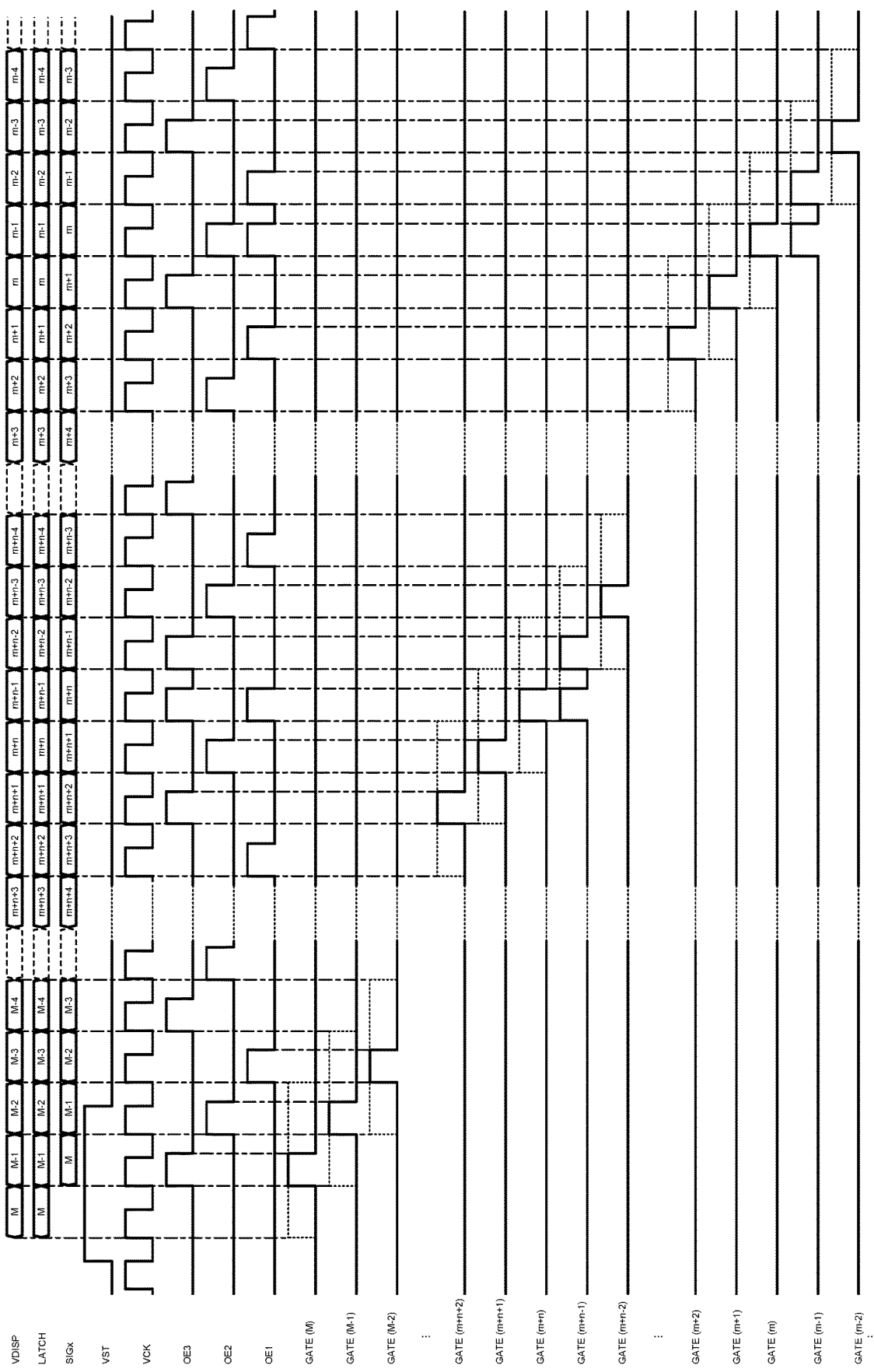
FIG. 10 is a diagram illustrating a timing chart according to a modification of the embodiment.

FIG. 10 is a diagram illustrating a timing chart according to a modification of the embodiment. The example illustrated in FIG. 10 is different from the example illustrated in FIG. 9 in the scanning direction.

In the modification illustrated in FIG. 10, in the same manner as the first drive method illustrated in FIG. 5, image data is output in the order from image data RGB_DATA(M) corresponding to image data VDIP(M) to RGB_DATA(1) corresponding to image data VDISP(1), and hence the first line memory 151 and the second line memory 152 may be omitted.

In the modification illustrated in FIG. 10, the multiplexer 153 outputs image data VDISP as image data RGB_DATA in all horizontal periods. The source driver 13 holds the input image data RGB_DATA in the latch 132, and then supplies the image data as a pixel signal group SIGx (pixel signals SIG(1, 2, . . . , P)) corresponding to pixels Pix in the x-th row through the DA converter 133 and the source signal output circuit 134.

In each pixel Pix (first pixel) in the (m+n)th row, the pixel electrode 22($m$+n) overlaps with the drive electrode COML(a) (first drive electrode), and the gate line GCL(m+n) overlaps with the drive electrode COML(a+1) (second drive electrode). In one horizontal period H(m+n−1) during which a pixel signal SIG is output to each pixel Pix in the (m+n)th row (first horizontal period), the image data RGB_DATA(m+n) held in the latch 132, which corresponds to the pixels Pix (first pixels) in the (m+n)th row, is output through the DA converter 133 and the source signal output circuit 134 as a pixel signal group SIGx(m+n) (pixel signals SIG(1, 2, . . . , P) (first pixel signals)); and image data VDIP(m+n−1) corresponding to the pixel Pix (second pixel) in the (m+n−1)th row is held in the latch 132 as image data RGB_DATA(m+n−1).

In one horizontal period H(m+n−1) (first horizontal period), the gate driver 12 simultaneously drives the pixels Pix (first pixels) in the (m+n)th row and the pixels Pix (second pixels) in the (m+n−1)th row. In other words, the gate driver 12 supplies gate signals GATE(m+n,m+n−1) of high level to the gate line GCL(m+n) coupled to the pixels Pix in the (m+n)th row and the gate line GCL(m+n−1) coupled to the pixels Pix in the (m+n−1)th row, respectively. In each pixel Pix (second pixel) in the (m+n−1)th row, the pixel electrode 22($m$+n−1) and the gate line GCL(m+n−1) overlap with the drive electrode COML(a) (first drive electrode).

The variation amount $\Delta Vgc(m+n)$ of the pixel potential in each of the pixels Pix (first pixels) in the (m+n)th row when the pixels Pix (first pixels) in the (m+n)th row and the pixels Pix (second pixels) in the (m+n−1)th row are simultaneously driven in the first horizontal period, can be made substantially equal to the variation amount $\Delta Vgc(m+n−1)$ of the pixel potential when the pixels Pix (second pixels) in the (m+n−1)th row are driven in the second horizontal period subsequent to the first horizontal period.

Subsequently, in one horizontal period H(m+n−2) (second horizontal period), the gate driver 12 drives each pixel Pix (second pixel) in the (m+n−1)th row. In other words, the gate driver 12 supplies a gate signal GATE(m+n−1) of high level to the gate line GCL(m+n−1) coupled to the pixels Pix in the (m+n−1)th row. In this case, the image data RGB_DATA(m+n−1) held in the latch 132, which corresponds to the pixels Pix (second pixel) in the (m+n−1)th row, is output through the DA converter 133 and the source signal output circuit 134 as a pixel signal group SIGx (pixel signals SIG(1, 2, . . . , P) (second pixel signals)); and image data VDIP(m+n−2) corresponding to the pixels Pix (third pixels) in the (m+n−2)th row is held in the latch 132 as image data RGB_DATA(m+n−2).

In a plurality of horizontal periods (third horizontal periods) before the first horizontal period, the gate driver 12 sequentially drives a plurality of pixels Pix (third pixels) in each of which the pixel electrode 22 and the gate line GCL overlap with the drive electrode COML(a+1) (second drive electrode), in a direction (fourth direction) from the pixels Pix (first pixels) in the (m+n)th row toward the pixels Pix (second pixels) in the (m+n−1)th row for each horizontal period. The source driver 13 sequentially supplies the pixel signal group SIGx (pixel signals SIG(1, 2, . . . , P) (third pixel signals)) corresponding to the pixels Pix (third pixels) in each row driven by the gate driver 12.

In a plurality of horizontal periods (fourth horizontal periods) after the second horizontal period, the gate driver 12 sequentially drives a plurality of pixels Pix (fourth pixels) in each of which the pixel electrode 22 and the gate line GCL overlap with the drive electrode COML(a) (first drive electrode), in a direction (fourth direction) from the pixels Pix (first pixels) in the (m+n)th row toward the pixels Pix (second pixels) in the (m+n−1)th row for each horizontal period. The source driver 13 sequentially supplies the pixel signal group SIGx (pixel signals SIG(1, 2, . . . , P) (fourth pixel signals)) corresponding to the pixels Pix (fourth pixels) in each row driven by the gate driver 12.

In each pixel Pix (first pixel) in the m-th row, the pixel electrode 22(m) overlaps with the drive electrode COML(a−1) (first drive electrode) and the gate line GCL(m) overlaps with the drive electrode COML(a) (second drive electrode). In one horizontal period H(m+1) (first horizontal period) during which a pixel signal SIG is output to each pixel Pix in the m-th row, the image data RGB_DATA(m) held in the latch 132, which corresponds to the pixels Pix (first pixels) in the m-th row, is output through the DA converter 133 and the source signal output circuit 134 as a pixel signal group SIGx (pixel signals SIG(m)(1, 2, . . . , P) (first pixel signals)); and image data VDIP(m−1) corresponding to the pixels Pix (second pixels) in the (m+n−1)th row is held in the latch 132 as image data RGB_DATA(m−1).

In one horizontal period H(m+n−1) (first horizontal period), the gate driver 12 simultaneously drives each pixel Pix (first pixel) in the m-th row and each pixel Pix (second pixel) in the (m−1)th row. In other words, the gate driver 12 supplies gate signals GATE(m,m−1) of high level to the gate line GCL(m) coupled to the pixels Pix in the m-th row and the gate line GCL(m−1) coupled to the pixels Pix in the (m−1)th row, respectively. In each pixel Pix (second pixel) in the (m−1)th row, the pixel electrode 22(m−1) and the gate line GCL(m−1) overlap with the drive electrode COML(a−1) (first drive electrode).

The variation amount ΔVgc(m) of the pixel potential in each of the pixels Pix (first pixels) in the m-th row when the pixels Pix (first pixels) in the m-th row and the pixels Pix (second pixels) in the (m−1)th row are simultaneously driven in the first horizontal period, can be made substantially equal to the variation amount ΔVgc(m−1) of the pixel potential when the pixels Pix (second pixel) in the (m−1)th row are driven in the second horizontal period subsequent to the first horizontal period.

Subsequently, in one horizontal period H(m+n−2) (second horizontal period), the gate driver 12 drives each pixel Pix (second pixel) in the (m−1)th row. In other words, the gate driver 12 supplies a gate signal GATE(m−1) of high level to the gate line GCL(m−1) coupled to the pixels Pix in the (m−1)th row. In this case, the image data RGB_DATA(m−1) held in the latch 132, which corresponds to the pixels Pix (second pixels) in the (m−1)th row, is output through the DA converter 133 and the source signal output circuit 134 as a pixel signal group SIGx (pixel signals SIG(1, 2, . . . , P) (second pixel signals)); and image data VDIP(m−2) corresponding to the pixels Pix (third pixels) in the (m+n+1)th row is held in the latch 132 as image data RGB_DATA(m−2).

In a plurality of horizontal periods (third horizontal periods) before the first horizontal period, the gate driver 12 sequentially drives a plurality of pixels Pix (third pixels) in each of which the pixel electrode 22 and the gate line GCL overlap with the drive electrode COML(a) (second drive electrode), in a direction (fourth direction) from the pixels Pix (first pixels) in the m-th row toward the pixels Pix (second pixels) in the (m−1)th row for each horizontal period. The source driver 13 sequentially supplies the pixel signal group SIGx (SIG(1, 2, . . . , P) (third pixel signals)) corresponding to the pixels Pix (third pixels) in each row driven by the gate driver 12.

In a plurality of horizontal periods (fourth horizontal periods) after the second horizontal period, the gate driver 12 sequentially drives a plurality of pixels Pix (fourth pixels) in each of which the pixel electrode 22 and the gate line GCL overlap with the drive electrode COML(a−1) (first drive electrode), in a direction (fourth direction) from the pixels Pix (first pixels) in the m-th row toward the pixels Pix (second pixels) in the (m−1)th row for each horizontal period. The source driver 13 sequentially supplies the pixel signal group SIGx (SIG(1, 2, . . . , P) (fourth pixel signals)) corresponding to the pixels Pix (fourth pixels) in each row driven by the gate driver 12.

With the above-mentioned operation, the occurrence of a streak of unevenness on a displayed image can be reduced, and the reduction in display quality can be hampered.

In the modification illustrated in FIG. 10, in the first pixel, display based on the second pixel signal corresponding to the second pixel is performed in the first horizontal period, and display based on the first pixel signal corresponding to the first pixel is performed in the second horizontal period subsequent to the first horizontal period. With this operation, the fact that the display based on the second pixel signal corresponding to the second pixel is performed at the first pixel is not visually recognized in the first horizontal period.

In the above-mentioned embodiment, two examples in which scanning directions are different in the same configuration have been described, but the configuration corresponding to one of the scanning directions described above with reference to FIG. 9 and FIG. 10 may be employed.

For example, the above-mentioned embodiment describes an example in which the high period of the output pulse of the shift register 121 corresponds to three horizontal cycles, and in the high period of the output pulse of the shift register 121, the gate signals GATE(x) the timings of which are controlled by the gate signal output circuit 122 based on the gate signal output permission signals OE1, OE2, and OE3 are output. However, in a case where the configuration supports only the modification illustrated in FIG. 10, the high period of the output pulse of the shift register 121 only needs to corresponds to at least two horizontal cycles, and in the high period of the output pulse of the shift register 121, the gate signals GATE(x) the timings of which are controlled by the gate signal output circuit 122 based on at least two gate signal output permission signals only need to be output. More specifically, instead of the wiring WOE1 for supplying OE1 and the wiring WOE3 for supplying OE3 illustrated in FIG. 1, wiring WOE1A for supplying a signal OE1A obtained by combining the gate signal output permission signals OE1 and OE3 illustrated in FIG. 10 may be disposed, and the gate lines GCL, which would be coupled to the wiring WOE1 and the wiring WOE3, may be coupled to the wiring WOE1A instead. With this configuration, the number of wiring lines in the display device 1 can be reduced. The configuration for controlling the timings of the gate signals GATE(x) is not limited to the above.

Figure 11:
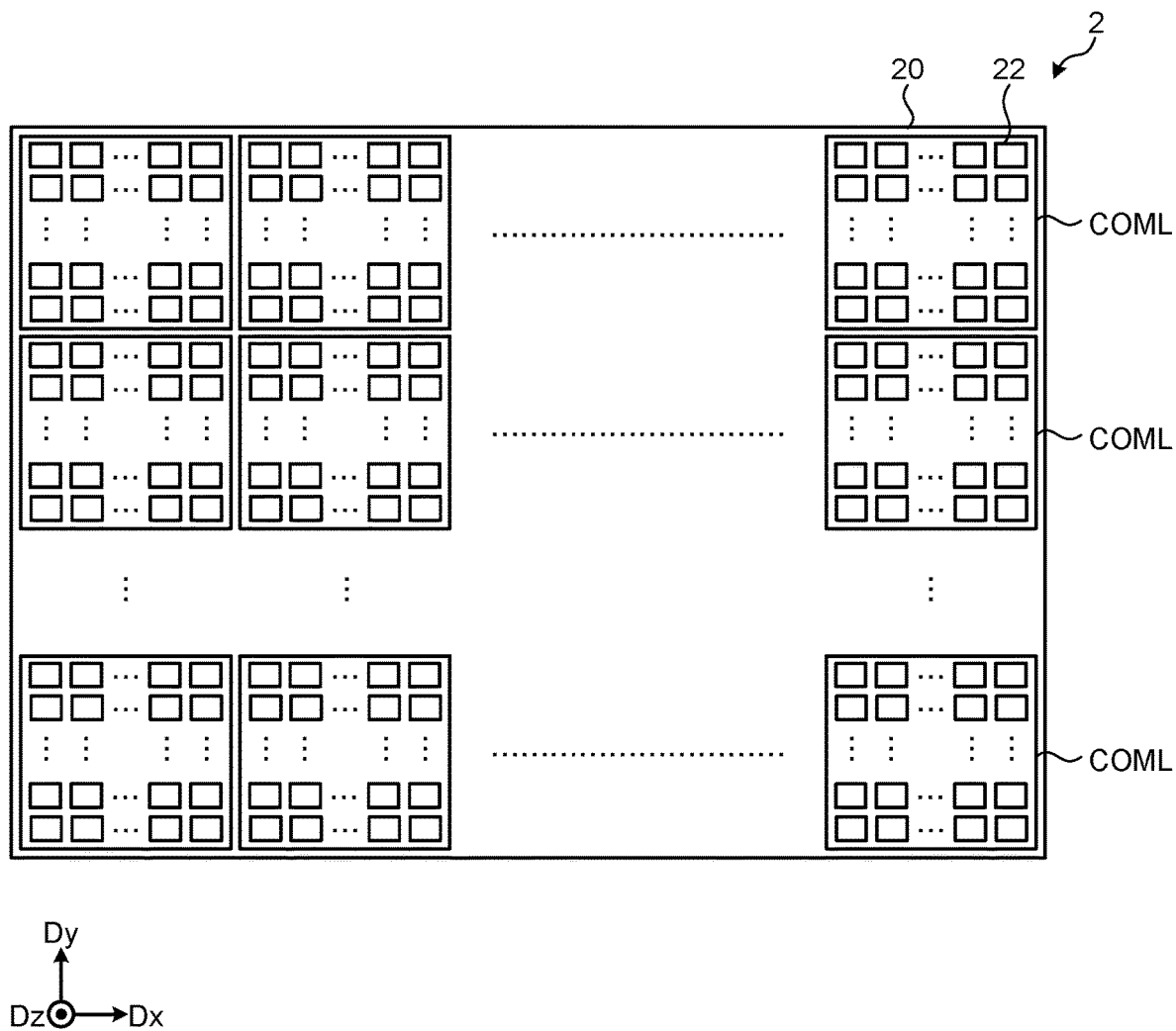
FIG. 11 is a plan view schematically illustrating a TFT substrate different from that in FIG. 3 included in the display device according to the embodiment.

FIG. 3 illustrates the shape in which the drive electrodes COML extend in the direction Dx and are arranged in the direction Dy, but the shape is not limited thereto. FIG. 11 is a plan view schematically illustrating a TFT substrate different from that in FIG. 3 included in the display device according to the embodiment. For example, the drive electrodes COML may be disposed in a matrix (row-column configuration) as illustrated in FIG. 11. Even in such a case, the display unevenness can be reduced by driving the pixels as in the second drive method illustrated in FIG. 9 as long as the boundary region of the drive electrodes COML is disposed as illustrated in FIG. 5. In a case where the drive electrodes COML are disposed in a matrix (row-column configuration) as illustrated in FIG. 11, by coupling the drive electrode COML to the detection circuit 16, the drive electrode driver 14 supplies the drive signal Vcom for touch detection to the drive electrodes COML, and the detection circuit 16 receives the detection signals VDET from the drive electrodes COML that supplies the drive signal Vcom, whereby capacitive touch detection of self-capacitance type can be implemented. In this case, the touch detection electrodes TDL and the substrate and wiring that couple the touch detection electrodes TDL and the detection circuit 16 to each other may be omitted.

In the above-mentioned embodiment, the configuration in which the capacitive touch sensor is integrated in the display region 20 has been exemplified, but the drive electrodes COML only need to extend in the row direction (Dx direction) along the gate lines GCL, and, for example, the touch sensor is not necessarily required to be included. More specifically, the touch detection electrodes TDL and the detection circuit 16 may be omitted.

As described above, the display device 1 according to the embodiment includes: the display region 20 in which the pixels Pix are arranged in the row direction (Dx direction) and the column direction (Dy direction); the gate driver 12 for driving the pixels Pix arranged in the row direction (Dx direction) through the gate lines GCL; the source driver 13 for supplying the pixel signals SIG to the pixels Pix arranged in the column direction (Dy direction) through the signal line SGL; and the drive electrodes COML that overlap with the display region 20 and extend in the row direction (Dx direction). The gate driver 12 simultaneously drives the first pixel and the second pixel adjacent to the first pixel. In the first pixel, the pixel electrode 22 (first pixel electrode) overlaps with the first drive electrode, and the gate line GCL (first gate line) overlaps with the second drive electrode adjacent to the first drive electrode. In the second pixel, the pixel electrode 22 (second pixel electrode) and the gate line GCL (second gate line) overlap with the first drive electrode.

In this manner, the occurrence of a streak of unevenness on a displayed image can be reduced, and the reduction in display quality can be hampered.

The gate driver 12 simultaneously drives the first pixel and the second pixel in the first horizontal period, and drives the second pixel in the second horizontal period subsequent to the first horizontal period.

The source driver 13 supplies the first pixel signal corresponding to the first pixel in the first horizontal period, and supplies the second pixel signal corresponding to the second pixel in the second horizontal period.

With this operation, the fact that the display based on the first pixel signal corresponding to the first pixel is performed at the second pixel can be hampered from being visually recognized in the first horizontal period.

According to the present embodiment, the display device can be provided in which the reduction in display quality can be hampered.

In the above-mentioned embodiment, the components can be combined as appropriate. It should be understood that other functions and effects obtained by the forms described in the present embodiment that are obvious from the description in the present specification and that could be appropriately conceived by a person skilled in the art are obtained by the present disclosure.

What is claimed is:

1. A display device comprising:
    a plurality of pixel electrodes including a first pixel electrode and a second pixel electrode adjacent to the first pixel electrode in a first direction;
    a plurality of switching elements including a first switching element coupled to the first pixel electrode and a second switching element coupled to the second pixel electrode;
    a plurality of gate lines including a first gate line coupled to the first switching element and a second gate line coupled to the second switching element, and extending in a second direction intersecting the first direction;
    a gate driver configured to supply a gate signal to the gate lines; and
    a plurality of drive electrodes including a first drive electrode and a second drive electrode adjacent to the first drive electrode in the first direction, wherein
    the first drive electrode overlaps with the first pixel electrode, the second pixel electrode, and the second gate line,
    the second drive electrode overlaps with the first gate line, and
    the first gate line is not overlapped by the first drive electrode.

2. The display device according to claim 1, wherein the gate driver is configured to supply the gate signal to the first gate line and the second gate line simultaneously.

3. The display device according to claim 1, wherein
    the gate driver is configured to supply the gate signal to the first gate line and the second gate line simultaneously in a first horizontal period, and supply the gate signal to the second gate line in a second horizontal period subsequent to the first horizontal period.

4. The display device according to claim 3, further comprising:
    a plurality of signal lines including a first signal line coupled to the first switching element and the second switching element; and
    a source driver configured to supply pixel signals to the signal lines, wherein
    the source driver is configured to supply a first pixel signal corresponding to the first pixel electrode to the first signal line in the first horizontal period, and supply a second pixel signal corresponding to the second pixel electrode to the first signal line in the second horizontal period.

5. The display device according to claim 4, wherein
    the pixel electrodes include a third pixel electrode adjacent to the second pixel electrode in the first direction,
    the switching elements include a third switching element coupled to the third pixel electrode,
    the gate lines include a third gate line coupled to the third switching element,
    the first drive electrode overlaps with the third pixel electrode and the third gate line,
    the first signal line is coupled to the third switching element,
    the gate driver is configured to supply the gate signal to the third gate line in a third horizontal period before the first horizontal period, and
    the source driver is configured to supply a third pixel signal corresponding to the third pixel electrode to the first signal line in the third horizontal period.

6. The display device according to claim 4, wherein
    the pixel electrodes include a fourth pixel electrode adjacent to the first pixel electrode in the first direction,
    the switching elements include a fourth switching element coupled to the fourth pixel electrode,
    the gate lines include a fourth gate line coupled to the fourth switching element,
    the second drive electrode overlaps with the fourth pixel electrode and the fourth gate line,
    the first signal line is coupled to the fourth switching element, the gate driver is configured to supply the gate signal to the fourth gate line in a fourth horizontal period after the first horizontal period, and the source driver is configured to supply a fourth pixel signal corresponding to the fourth pixel electrode to the first signal line in the fourth horizontal period.

7. The display device according to claim 4, wherein
the pixel electrodes include a third pixel electrode adjacent to the first pixel electrode in the first direction,
the switching elements include a third switching element coupled to the third pixel electrode,
the gate lines include a third gate line coupled to the third switching element,
the second drive electrode overlaps with the third pixel electrode and the third gate line,
the first signal line is coupled to the third switching element,
the gate driver is configured to supply the gate signal to the third gate line in a third horizontal period before the first horizontal period, and
the source driver is configured to supply a third pixel signal corresponding to the third pixel electrode to the first signal line in the third horizontal period.

8. The display device according to claim 4, wherein
the pixel electrodes include a fourth pixel electrode adjacent to the second pixel electrode in the first direction,
the switching elements include a fourth switching element coupled to the fourth pixel electrode,
the gate lines include a fourth gate line coupled to the fourth switching element,
the first drive electrode overlaps with the fourth pixel electrode and the fourth gate line,
the first signal line is coupled to the fourth switching element,
the gate driver is configured to supply the gate signal to the fourth gate line in a fourth horizontal period after the first horizontal period, and
the source driver is configured to supply a fourth pixel signal corresponding to the fourth pixel electrode to the first signal line in the fourth horizontal period.

9. A display device comprising:
a plurality of pixels arranged in a first direction and a second direction;
a gate driver configured to drive the pixels arranged in the second direction through gate lines;
a source driver configured to supply pixel signals to the pixels arranged in the first direction through signal lines; and
a plurality of drive electrodes arranged in the first direction, wherein
the pixels include a first pixel and a second pixel adjacent to the first pixel,
the drive electrodes include a first drive electrode and a second drive electrode adjacent to the first drive electrode,
the gate lines include a first gate line and a second gate line,
the first pixel is a pixel in which a first pixel electrode overlaps with the first drive electrode and the first gate line overlaps with the second drive electrode,
the second pixel is a pixel in which a second pixel electrode and the second gate line overlap with the first drive electrode, and
the first gate line is not overlapped by the first drive electrode.

10. The display device according to claim 9, wherein the gate driver is configured to drive the first pixel and the second pixel simultaneously.

11. The display device according to claim 9, wherein
the gate driver is configured to drive the first pixel the second pixel simultaneously in a first horizontal period, and drive the second pixel in a second horizontal period subsequent to the first horizontal period.

12. The display device according to claim 11, wherein
the source driver is configured to supply a first pixel signal corresponding to the first pixel in the first horizontal period, and supply a second pixel signal corresponding to the second pixel in the second horizontal period.

13. The display device according to claim 12, wherein
a direction from the second pixel toward the first pixel is a third direction,
the gate driver is configured to, in a plurality of third horizontal periods before the first horizontal period, drive a plurality of third pixels sequentially in the third direction, the third pixels being pixels that are coupled to a signal line to which the first pixel and the second pixel are coupled, and in each of which a pixel electrode and a gate line overlap with the first drive electrode, and
the source driver is configured to, in the third horizontal periods, sequentially supply third pixel signals corresponding to the third pixels.

14. The display device according to claim 12, wherein
a direction from the second pixel toward the first pixel is a third direction,
the gate driver is configured to, in a plurality of fourth horizontal periods after the second horizontal period, drive a plurality of fourth pixels sequentially in the third direction, the fourth pixels being pixels that are coupled to a signal line to which the first pixel and the second pixel are coupled, and in each of which a pixel electrode and a gate line overlap with the second drive electrode, and
the source driver is configured to, in the fourth horizontal periods, sequentially supply fourth pixel signals corresponding to the fourth pixels.

15. The display device according to claim 12, wherein
a direction from the first pixel toward the second pixel is a fourth direction,
the gate driver is configured to, in a plurality of third horizontal periods before the first horizontal period, drive a plurality of third pixels sequentially in the fourth direction, the third pixels being pixel that are coupled to a signal line to which the first pixel and the second pixel are coupled, and in each of which a pixel electrode and a gate line overlap with the second drive electrode, and
the source driver is configured to, in the third horizontal periods, sequentially supply third pixel signals corresponding to the third pixels.

16. The display device according to claim 12, wherein
a direction from the first pixel toward the second pixel is a fourth direction,
the gate driver is configured to, in a plurality of fourth horizontal periods after the second horizontal period, drive a plurality of fourth pixels sequentially in the fourth direction, the fourth pixels being pixels that are coupled to a signal line to which the first pixel and the second pixel are coupled, and in each of which a pixel electrode and a gate line overlap with the first drive electrode, and the source driver is configured to, in the fourth horizontal period, sequentially supply fourth pixel signals corresponding to the fourth pixels.

* * * * *